(12) United States Patent
Zhang (10) Patent No.: US 12,497,985 B1
(45) Date of Patent: Dec. 16, 2025

(54) FIXATOR FOR TELESCOPIC ROD AND THE TELESCOPIC ROD

(71) Applicant: SANNWSG INC, Dover, DE (US)

(72) Inventor: Qingyun Zhang, Delaware, DE (US)

(73) Assignee: SANNWSG INC, Dover, DE (US)

( * ) Notice: Subject to any disclaimer, the term of this patent is extended or adjusted under 35 U.S.C. 154(b) by 0 days.

(21) Appl. No.: 19/280,613

(22) Filed: Jul. 25, 2025

(51) Int. Cl.
*F16B 7/10* (2006.01)

(52) U.S. Cl.
CPC ................. *F16B 7/105* (2013.01)

(58) Field of Classification Search
CPC .... F16B 7/10; F16B 7/105; F16B 7/04; F16B 7/0413; F16B 7/042; Y10T 403/32254; Y10T 403/32426; Y10T 403/32467; Y10T 403/32475; Y10T 403/32483; Y10T 403/32508; Y10T 403/7075; Y10T 403/7077; Y10T 403/7079; Y10T 403/7083; Y10T 403/7088; Y10T 403/59; Y10T 403/591; Y10T 403/598; Y10T 403/599; Y10T 403/602; Y10T 403/604
See application file for complete search history.

(56) References Cited

U.S. PATENT DOCUMENTS

| | | | | |
|---|---|---|---|---|
| 2,842,387 A * | 7/1958 | Clifford | ............... | F16B 7/1472 403/324 |
| 4,127,354 A * | 11/1978 | Mixon, Jr. | ........... | F16B 7/0426 403/279 |
| 6,457,897 B1 * | 10/2002 | Stangier | .................. | F16B 37/02 403/379.2 |
| 7,066,676 B2 * | 6/2006 | Tsai | ....................... | F16B 7/042 403/379.2 |
| 7,409,963 B2 * | 8/2008 | Mallookis | ............... | E04H 15/50 135/144 |
| 7,628,369 B2 * | 12/2009 | Chen | ...................... | F16B 7/105 248/354.3 |
| 7,849,867 B2 * | 12/2010 | Takayama | ............... | E04H 15/60 135/114 |
| 10,436,242 B2 * | 10/2019 | Hu | ........................... | B66F 3/10 |
| 11,479,985 B2 * | 10/2022 | Huang | .................. | E04H 4/0056 |
| 12,013,065 B2 * | 6/2024 | Nagaya | .................. | F16B 21/186 |
| 2006/0051159 A1 * | 3/2006 | Tsai | ....................... | F16B 7/105 403/109.3 |
| 2014/0030016 A1 * | 1/2014 | Lee | ......................... | F16B 7/105 403/355 |

FOREIGN PATENT DOCUMENTS

| | | | | |
|---|---|---|---|---|
| DE | 3604497 A1 * | 8/1987 | .......... | F16M 11/245 |
| GB | 257406 A * | 9/1926 | ............. | F16B 7/105 |

* cited by examiner

*Primary Examiner* — Jonathan P Masinick
(74) *Attorney, Agent, or Firm* — Hawaii Patent Services; Nathaniel K. Fedde; Kenton N. Fedde (57) ABSTRACT

The present disclosure relates to a fixator for a telescopic rod and the telescopic rod. The telescopic rod comprises an outer tube and an inner tube, both being hollow and slidably nested; the fixator includes a fixation base, a locking member, and an elastic member. The locking legs of the locking member are engaged with the locking holes of the inner tube to achieve locking/unlocking, while the elastic member drives automatic reset. It addresses the issues of complex structure and short lifespan in existing locking devices, improving the stability and longevity of telescopic locking, and is applicable for various scenarios requiring telescopic locking.

20 Claims, 10 Drawing Sheets

FIXATOR FOR TELESCOPIC ROD AND THE TELESCOPIC ROD

TECHNICAL FIELD

The present disclosure relates to the technical field of telescopic rods, particularly to a fixator for a telescopic rod and the telescopic rod.

BACKGROUND

As an adjustable-length support component, telescopic rods are widely used in various scenarios such as camping stands, outdoor work support poles, and sports equipment supports. Their primary function is to provide stable support for equipment through length adjustment, making them an indispensable basic component in outdoor activities and equipment setup.

To meet the adjustment needs of telescopic rod lengths in different usage scenarios, telescopic rods typically require locking devices to achieve positioning and fixation after extension or retraction, ensuring structural stability under force and thereby guaranteeing the support strength and usage safety of the overall equipment, preventing support failure due to loosening of the telescopic rod.

Currently, locking devices for telescopic rods in existing technologies generally suffer from overly complex structural designs. This complexity not only leads to cumbersome production and assembly processes, increasing manufacturing costs, but more importantly, due to the inclusion of numerous mating components, wear and stress concentration between parts become prominent during long-term repeated extension and locking operations, easily causing fatigue damage to components and significantly shortening the service life of the locking device.

As a core functional component of the telescopic rod, the shortened service life of the locking device directly impacts the normal use of the equipment: when the locking device fails, the telescopic rod cannot be effectively fixed, resulting in unstable support structures prone to slipping or shaking under load or external impact. In severe cases, this can lead to imbalance or tipping of the equipment support, losing its support function, causing great inconvenience to users and even posing potential threats to their personal safety.

SUMMARY

The present disclosure provides a fixator for a telescopic rod and the telescopic rod itself, aiming to address the issues raised in the background art.

To achieve the above-mentioned object, the present disclosure adopts the following technical solution:

A fixator for a telescopic rod, comprising: a fixation base provided with an installation channel for nesting the telescopic rod, an inner wall of the installation channel defining an inner profile; and a locking member comprising a grip part and a pair of locking legs integrally extending from both sides of the grip part, the tail ends of the locking legs forming limiting ends, and the locking member being movably connected to the fixation base; and an elastic member disposed between the fixation base and the locking member and configured for providing an elastic restoring force to bias the locking member toward a locked position.

The fixation base is provided with a lock hole corresponding to each locking leg, and the lock hole comprises an unlocking hole position. In the locked position, the limiting ends protrude beyond the inner profile of the installation channel; and in an unlocked position, by applying an external force to press the grip part against an elastic force of the elastic member, the locking legs are driven to move, allowing the limiting ends to be accommodated within corresponding unlocking hole positions.

The beneficial effects of the present disclosure compared to the existing technology are:

The fixator simplifies the structural composition, achieves automatic reset and locking through an elastic member, streamlines the operation process, and enhances adjustment efficiency. The engagement structure between the locking leg and the locking hole forms a reliable axial limit, significantly improving the locking stability of the telescopic rod and effectively mitigating the risk of structural wobbling or collapse due to loose support. Multiple sets of locking holes axially spaced on the inner tube enable multi-gear telescopic adjustment, meeting the dimensional requirements of diverse usage scenarios. Its core locking principle can be extended to products requiring telescopic locking functions, such as outdoor sunshades and portable clothes racks, offering broad applicability and promotional value.

BRIEF DESCRIPTION OF DRAWINGS

The drawings, which form part of this application, are provided to further illustrate the present disclosure. The illustrative embodiments and the descriptions thereof are intended to explain the present disclosure and do not constitute undue limitations. In the drawings.

Reference signs: Outer tube (100); First accommodating cavity (101); Fixation end (110); Groove (111); Locking notch (112); Second through hole (120); Inner tube (200); Second accommodating cavity (201); First elastic member (210); First through hole (220); Locking hole (230); Fixator (300); Fixation base (310); Through slot (311); Clip (312); Locking boss (313); Lock hole (314); Unlocking hole position (3141); First stopper post (315); Positioning groove (316); Second elastic member (320); First end part (321); Second end part (322); Locking member (330); Grip part (331); Locking leg (332); Limiting end (3321); Second stopper post (333).

DESCRIPTION OF EMBODIMENTS

The technical solution in the embodiment of the present disclosure will be clearly and completely described below with reference to the drawings. Obviously, the described embodiment is part of, rather than all of the embodiments of the present disclosure. The following description of at least one exemplary embodiment is illustrative in nature and is in no way intended to limit the present disclosure, its application or uses. Based on the embodiments in the present disclosure, all other embodiments obtained by those skilled in the art without creative work belong to the scope of protection of the present disclosure.

It should be noted that the terminology used here is only for describing specific embodiments, and is not intended to limit exemplary embodiments according to the present application. As used herein, the singular form is also intended to include the plural form unless the context clearly indicates otherwise. Furthermore, it should be appreciated that when the terms "comprising" and/or "including" are used in this specification, they specify the presence of features, steps, operations, devices, components and/or combinations thereof.

Unless otherwise specified, the relative arrangement of components and steps, numerical expressions and numerical values set forth in these embodiments do not limit the scope of the present disclosure. At the same time, it should be appreciated that for the convenience of description, the dimensions of various parts shown in the drawings are not drawn according to the actual scale relationship. Techniques, methods and equipment known to those skilled in the art may not be discussed in detail, but in appropriate cases, they should be regarded as part of the authorization specification. In all the examples shown and discussed herein, any specific values should be interpreted as illustrative, and not as limiting. Therefore, other examples of exemplary embodiments may have different values. It should be noted that similar numbers and letters indicate similar items in the following drawings, therefore once an item is defined in one drawing, it does not need to be further discussed in subsequent drawings.

In the present disclosure, addressing the issues in the prior art where the locking device for telescopic rods has a complex structure and short service life, thereby affecting the normal use of the telescopic rod, a fixator for a telescopic rod and the telescopic rod are provided. The fixator achieves reliable locking of the telescopic rod through the structural coordination of the fixation base, elastic member, and locking member, effectively enhancing the stability and service life of telescopic locking. Below, the embodiments of the fixator for a telescopic rod and the telescopic rod of the present disclosure will be described in detail with reference to the accompanying drawings.

Figure 1:
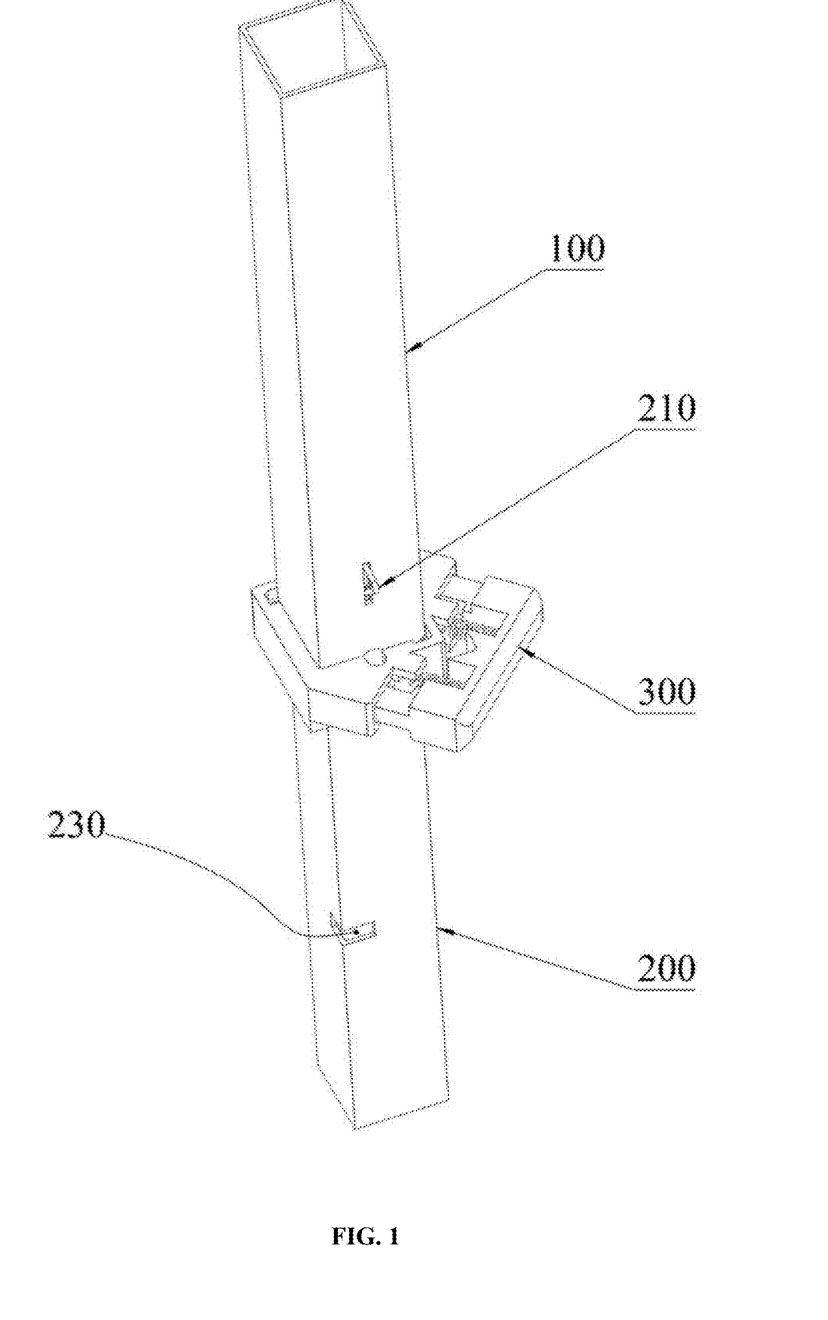
FIG. 1 is a perspective schematic of the fixator for a telescopic rod and the telescopic rod provided by an embodiment of the present disclosure.
Figure 2:
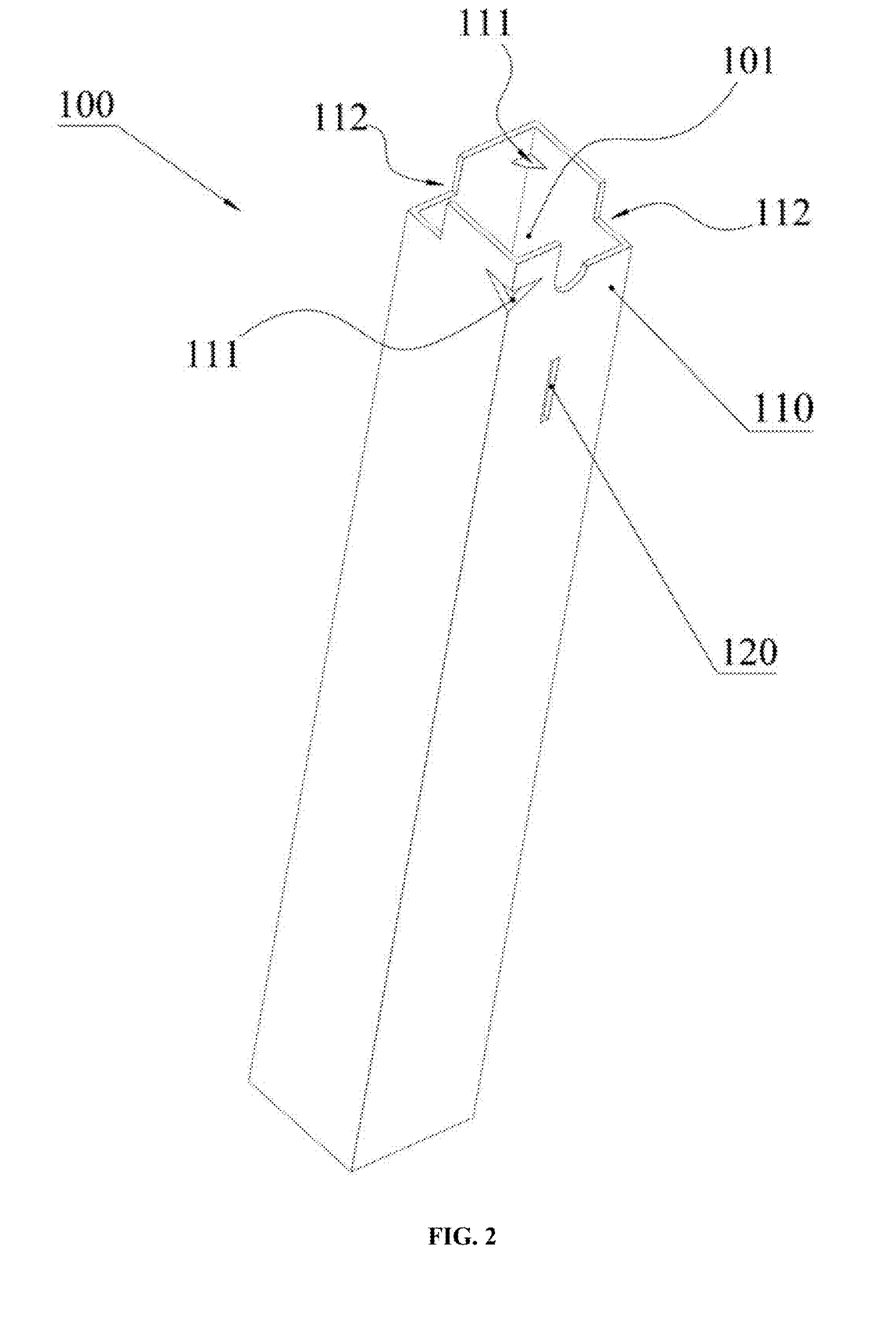
FIG. 2 is a perspective schematic of the outer tube of the telescopic rod in the embodiment shown in FIG. 1.

As shown in FIGS. 1 and 2, this embodiment provides a fixator for a telescopic rod and the telescopic rod itself. The telescopic rod includes an outer tube 100 and an inner tube 200, with the fixator 300 configured to be mounted on the outer surface of the outer tube 100. The outer tube 100 is designed as a square tubular support rod extending longitudinally in the vertical direction, with a hollow interior forming a first accommodating cavity 101. The inner tube 200 is slidably installed within the first accommodating cavity 101. The fixation end 110 of the outer tube 100 includes four diagonal tube walls, with one pair forming a pair of grooves 111 symmetrically distributed along the circumference of the outer tube 100. These grooves 111 are configured with openings facing the first accommodating cavity 101, featuring a triangular cross-section and recessed inward along the axial direction of the outer tube 100 to assist in securing the fixator 300 to the outer tube 100. The other pair of diagonal tube walls at the fixation end 110 is provided with a pair of locking notches 112, through which the fixator 300 can establish a fixed connection with the inner tube 200.

In other embodiments (not shown), the outer tube 100, besides the aforementioned square tubular support rod, can also be configured as a cylindrical support rod, triangular support rod, rounded rectangular column support rod, or any other desired shape.

Figure 3:
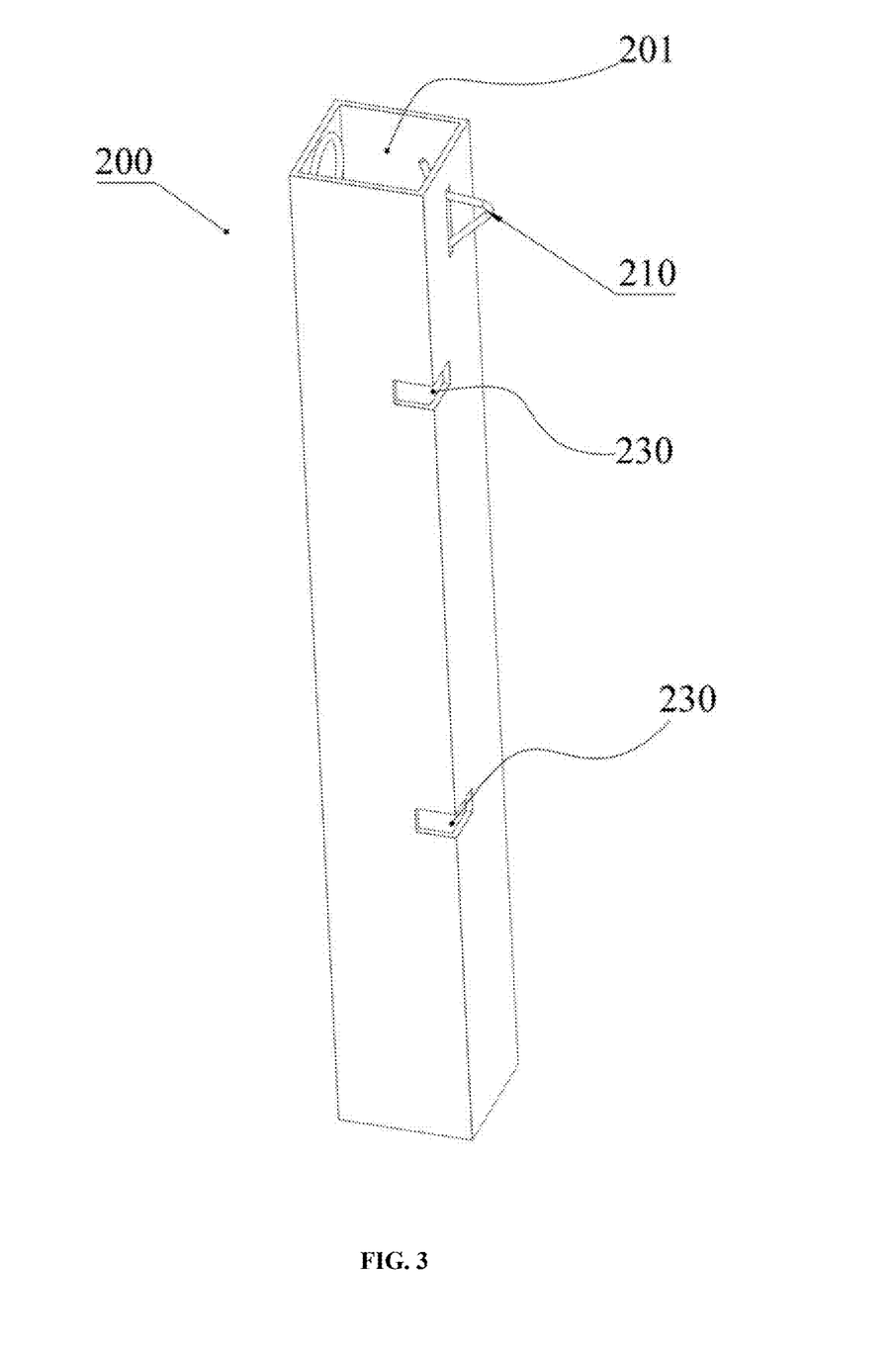
FIG. 3 is a structural schematic of the inner tube of the telescopic rod in the embodiment shown in FIG. 1.
Figure 8:
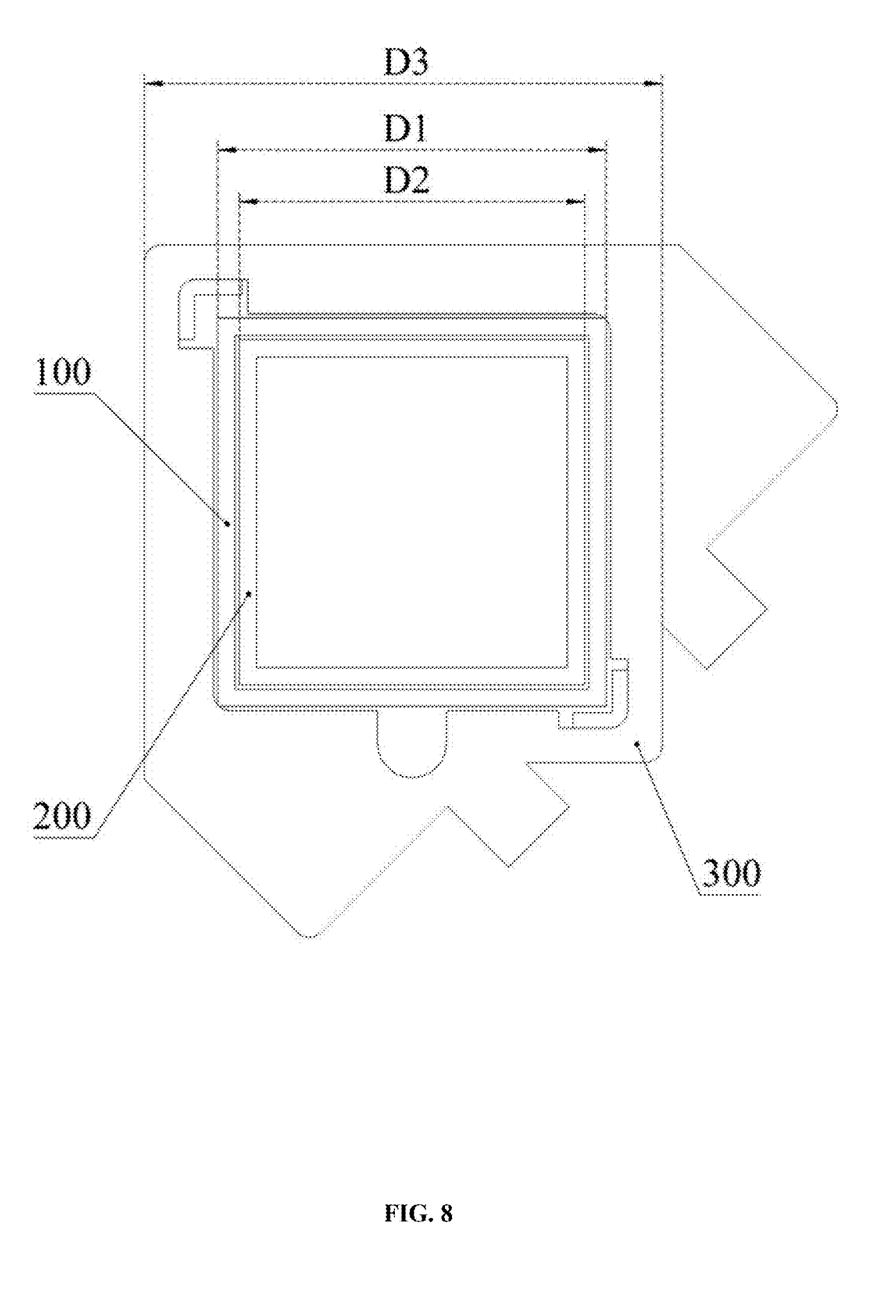
FIG. 8 is a top view of the fixator for a telescopic rod and the telescopic rod in the embodiment shown in FIG. 1.

As shown in FIGS. 3 and 8, the inner tube 200 is configured to match the shape of the outer tube. In the preferred embodiment, the inner tube 200 is designed as a square tubular support rod extending longitudinally in the vertical direction. The outer tube 100 has a square cross-section (see FIG. 2), with a side length defined as D1, while the inner tube 200 has a cross-sectional side length defined as D2, satisfying the dimensional relationship D1>D2. This allows the inner tube 200 to be adaptively inserted into the lumen of the outer tube 100, with the outer wall of the inner tube 200 forming a tightly fitted, slidable sleeve connection with the inner wall of the outer tube 100.

Figure 4:
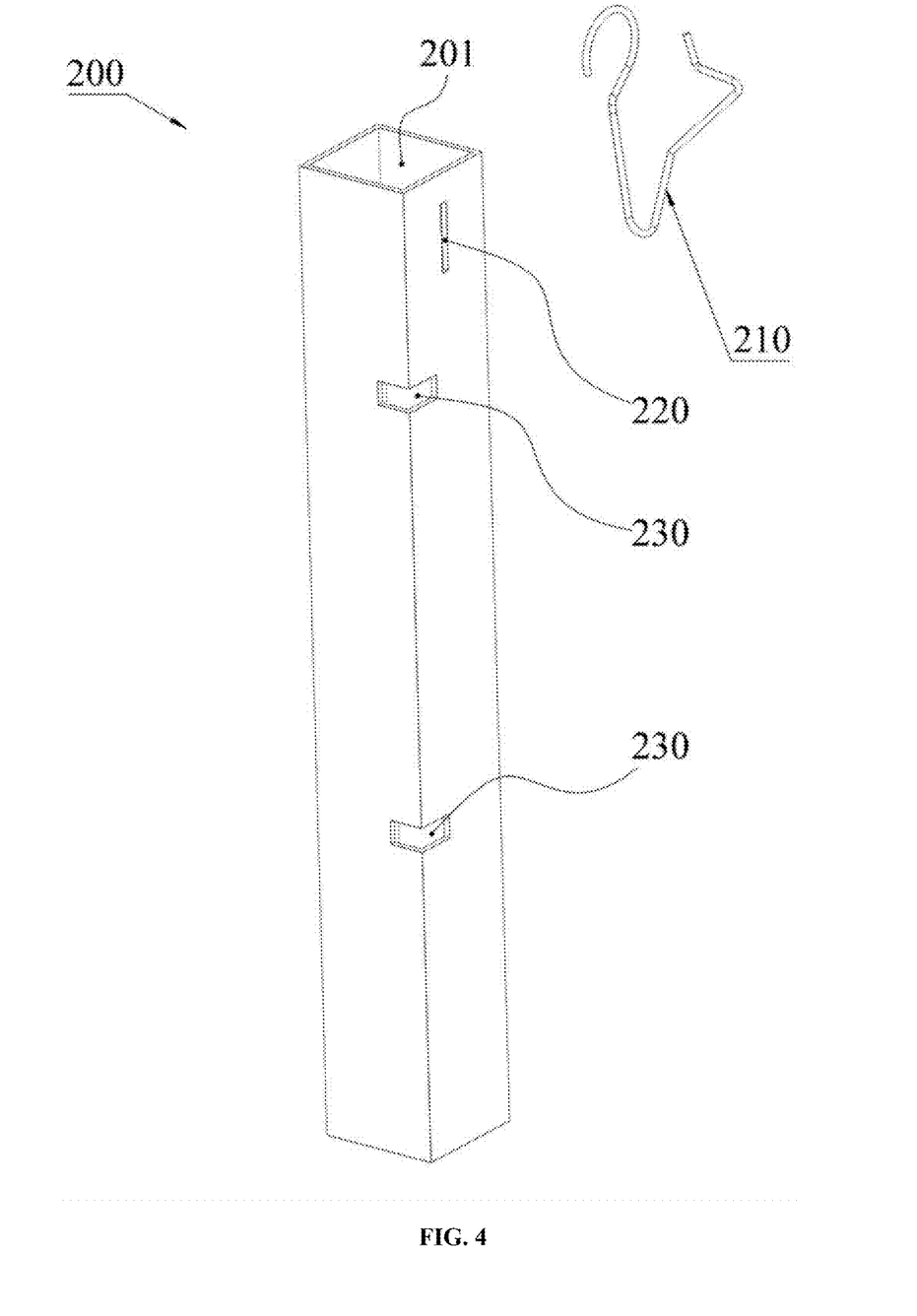
FIG. 4 is an exploded schematic of the inner tube of the telescopic rod in the embodiment shown in FIG. 3.

Specifically, referring to FIGS. 3 and 4, the inner tube 200 is a hollow tubular structure, enclosing a second accommodating cavity 201. Within the axial end region of the second accommodating cavity 201, a first elastic member 210 is installed, and the inner tube 200 features a long, strip-shaped first through hole 220 on its circumferential single-side wall. In the preferred embodiment of the present disclosure, the first elastic member 210 is a V-shaped spring plate made of nickel-plated 65Mn steel. One end of the first elastic member 210 abuts against the inner wall of the inner tube 200's cavity, while the other end extends outward through the first through hole 220. Correspondingly, the circumferential side wall of the outer tube 100 is provided with a second through hole 120, which has a shape identical to that of the first through hole 220, at a position coaxially adapted to the first through hole 220.

When the outer tube 100 and the inner tube 200 are in the telescopic adjustment stroke, that is, when they have not reached the maximum extended length, the exposed end of the first elastic member 210 is constrained by the inner wall of the outer tube 100 and is entirely accommodated within the second accommodating cavity 201. When the outer tube 100 and the inner tube 200 are relatively extended to their limit stroke, i.e., at their maximum extended length, the exposed end of the first elastic member 210 sequentially passes through the first through hole 220 and the second through hole 120, forming a radial limiting mechanism that prevents the inner tube 200 from completely detaching from the lumen of the outer tube 100, ensuring the reliability of the assembly connection.

In other embodiments (not shown), the contour shapes of the first through hole 220 and the second through hole 120 can also be designed as various geometric shapes such as arcs, circles, or diamonds. Their specific forms can be adaptively adjusted according to actual assembly requirements and machining processes.

Referring to FIGS. 1 and 3, the inner tube 200 includes four diagonal tube walls. One pair of diagonal tube walls is axially spaced with two pairs of penetrating locking holes 230. The contour of each locking hole 230 matches the locking structure of the fixator 300, allowing the locking part of the fixator 300 to engage when the inner tube 200 and the outer tube 100 are telescopically adjusted to a preset position, thereby achieving axial locking and limiting between the inner tube 200 and the outer tube 100.

In other embodiments (not shown), the inner tube 200 can be configured not only with two pairs of locking holes 230 but also with three, four, five, or more groups of axially spaced locking hole sets according to actual adjustment needs. Increasing the number of locking hole 230 sets can expand the axial telescopic adjustment levels of the inner tube 200, meeting length adjustment requirements for different usage scenarios.

Figure 5:
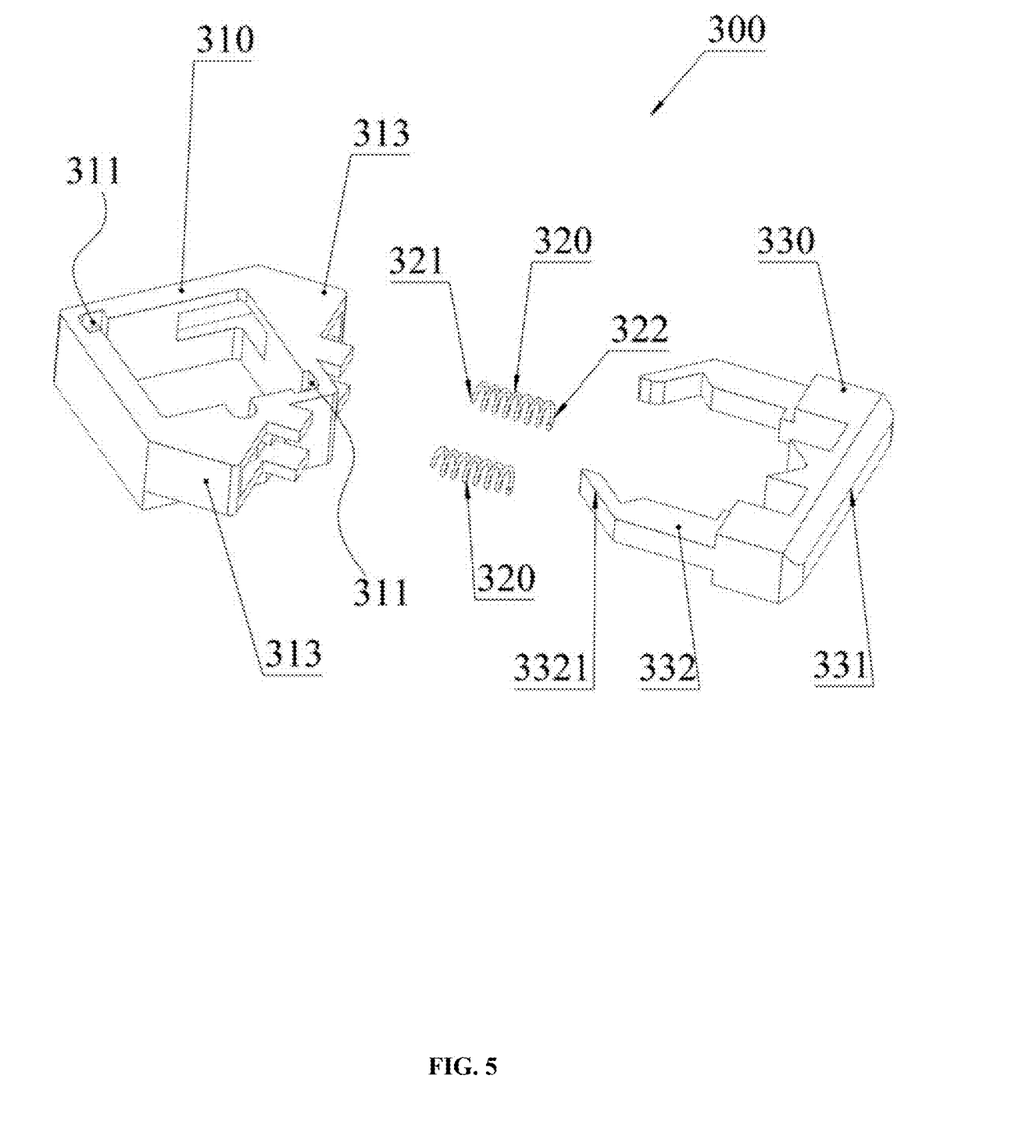
FIG. 5 is an exploded schematic of the fixator for a telescopic rod in the embodiment shown in FIG. 1.

As shown in FIGS. 5 and 8, the fixator 300 includes a fixation base 310, a second elastic member 320, and a locking member 330. The fixation base 310 is configured as an integrally formed square frame structure with a roughly square cross-section. The side length is defined as D3, satisfying the dimensional relationship D3>D1, enabling the fixation base 310 to be fixedly sleeved over the outer surface of the outer tube 100.

Specifically, the fixation base 310 is formed with an installation channel, the inner wall of which defines the inner profile of the fixation base 310. The installation channel is used to sleeve the outer tube 100. At the junctions of the four side walls of the fixation base 310, four diagonal tube walls are formed. A pair of diagonally opposite tube walls are symmetrically perforated in the circumferential direction with through slots 311 to accommodate the grooves 111 for positioning the outer tube 100. The middle of each through slot 311 is provided with an integrally formed clip 312. When the fixation base 310 is sleeved onto the outer surface of the outer tube 100, the clip 312 and the groove 111 form a snap-fit mechanism. This structure prevents the fixation base 310 from axially detaching from the outer tube 100 through the axial limiting effect between the locking surface of the clip 312 and the mating surface of the groove 111, ensuring the stability of their connection.

In other embodiments (not shown), the fixation base 310 can also be detachably installed on the outer tube 100 through a bolt structure. Specifically, a pair of diagonally opposite tube walls of the fixation base 310 are radially perforated with first threaded holes, while the corresponding tube walls of the outer tube 100 are provided with second threaded holes coaxially adapted to the first threaded holes. During assembly, the bolt sequentially passes through the first through hole and the second threaded hole along the radial direction of the outer tube 100 to form a threaded fit. Axial fastening is achieved by the abutment of the bolt head against the outer wall of the fixation base 310, replacing the snap-fit between the clip 312 and the groove 111.

In the preferred embodiment of the present disclosure, the second elastic member 320 is configured as a coil spring, positioned between the fixation base 310 and the locking member 330. Two circumferentially adjacent side walls of the fixation base 310 each radially extend outward to integrally form symmetrically distributed locking bosses 313. The inner walls of each locking boss 313 are provided with lock holes 314 to receive and accommodate the locking member 330. Each lock hole 314 is equipped with a first stopper post 315 that is configured as a cylindrical boss extending along the radial direction of the fixation base 310, to abut against the first end part 321 of the second elastic member 320.

In other embodiments (not shown), triangular reinforcing ribs or arc-shaped anti-deformation protrusions can be added at the junctions between the locking bosses 313 and the fixation base 310 to enhance the structural strength of these connection areas and prevent plastic deformation due to long-term stress.

Figure 6:
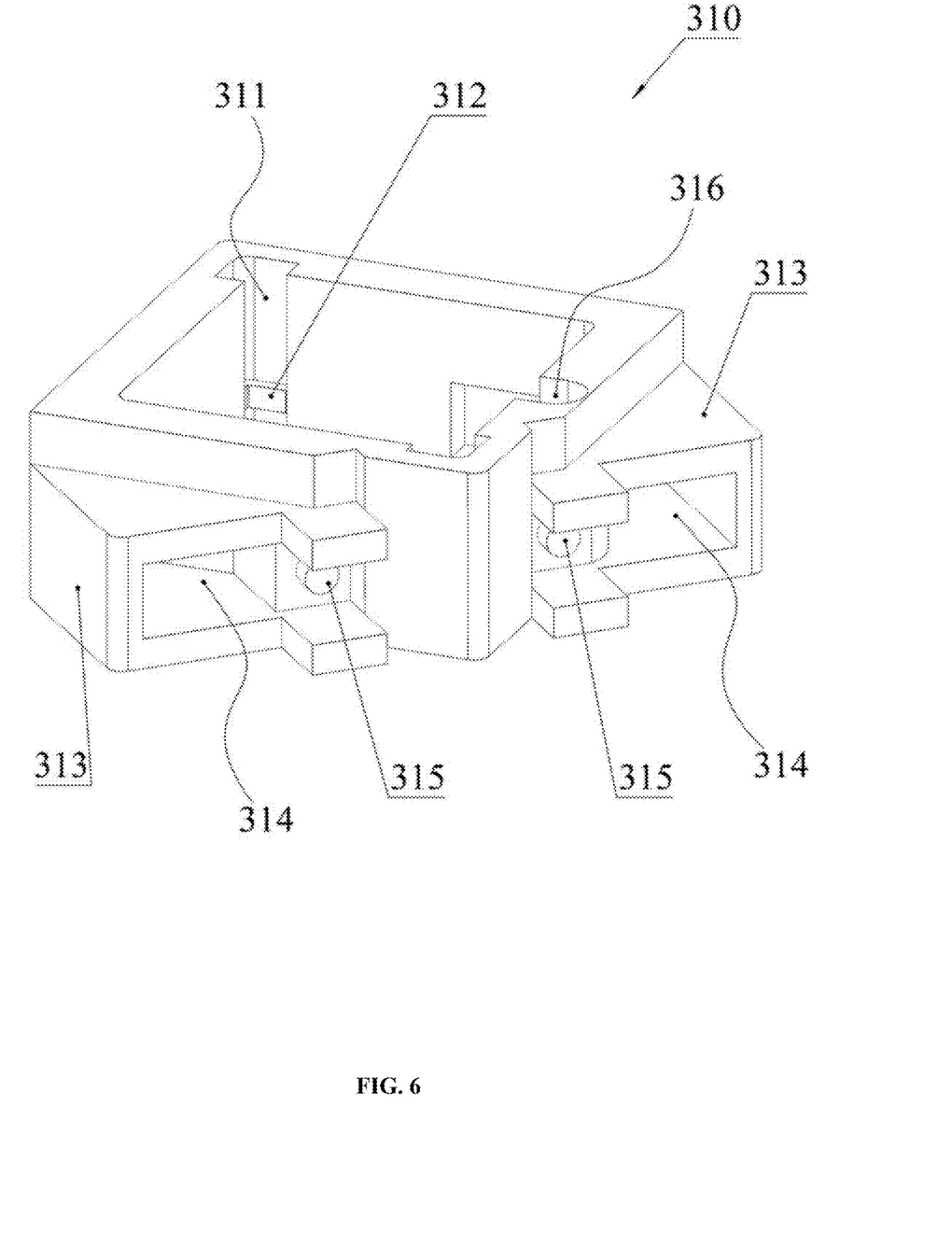
FIG. 6 is a perspective schematic of the fixation base in the embodiment shown in FIG. 5.

Referring to FIGS. 1 and 6, a circular positioning groove 316 is formed on the inner wall of one locking boss 313. When the inner tube 200 moves axially along the outer tube 100 until it completely is disengaged from the station, the first elastic member 210 can be embedded into the avoidance space formed by the circular positioning groove 316, preventing structural interference between the first elastic member 210 (as shown in FIG. 4) and the fixation base 310, ensuring the smooth extraction of the inner tube 200 from the outer tube 100.

Figure 7:
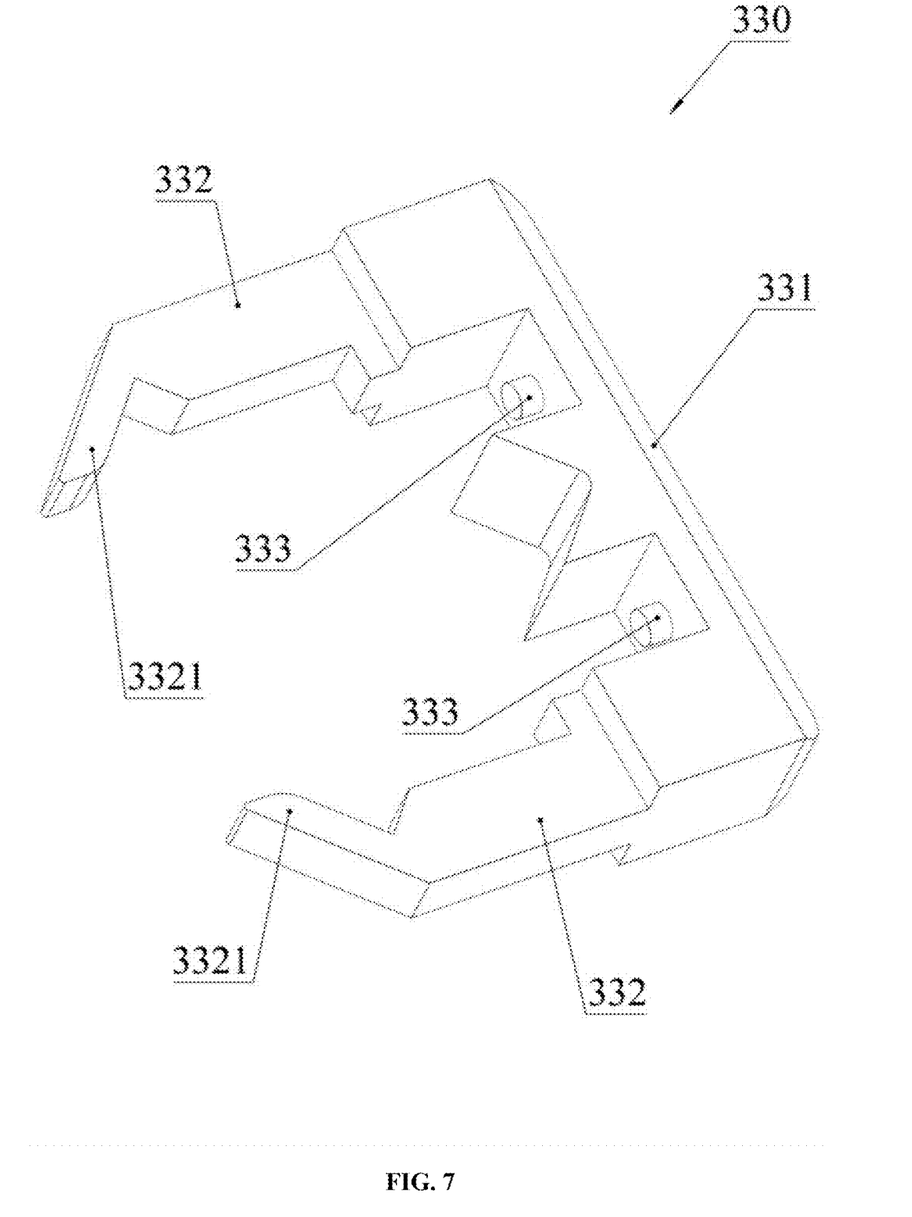
FIG. 7 is a perspective schematic of the locking member in the embodiment shown in FIG. 5.

As shown in FIGS. 5 and 7, the locking member 330 is an integrally formed U-shaped frame structure movably connected to the fixation base 310. The locking member 330 includes a grip part 331 and a pair of locking legs 332 symmetrically extending radially outward from both sides of the grip part 331 along the open side of the locking member 330. The grip part 331 is plate-shaped, with a central inward depression forming a V-shaped groove. Each end of the V-shaped groove is provided with a second stopper post 333, which is configured as a cylindrical boss extending radially along the locking member 330 and abuts against the second end part 322 of the second elastic member 320. When an external force drives the locking member 330 to the unlocked position, the second stopper post 333 compresses the second elastic member 320, causing elastic deformation. After the force is released, the restoring force of the second elastic member 320 transmits through the stopper post 333 to the locking member 330, driving it back to the locked position automatically, achieving the locking reset function.

In other embodiments (not shown), the second elastic member 320 may be omitted. In this case, the reset action of the locking member 330 is manually driven: the V-shaped groove tail ends of the locking legs 332 still retain the second stopper posts 333, but here, the second stopper posts 333 serve only as structural reinforcements without forming an abutting fit with an elastic member. When an external force drives the locking member 330 to the unlocked position and the extension length adjustment of the inner tube 200 is completed, the grip part 331 must be manually driven in reverse to restore the locking member 330 to the locked position.

In other embodiments (not shown), the grip part 331 may additionally feature an anti-slip design. Its outer surface can be integrally molded with uniformly distributed anti-slip patterns along the circumference or fitted with a silicone anti-slip sleeve. The anti-slip patterns enhance pressing stability by increasing the friction coefficient between the hand and the grip part 331, while the anti-slip sleeve boosts static friction through the elastic deformation of silicone material, simultaneously creating a cushioned contact interface to optimize tactile feedback. Both solutions reduce the risk of hand slippage during operation.

In other embodiments (not shown), a limiting baffle or anti-drop pin can be added to the fitting gap between the fixation base 310 and the locking member 330. The limiting baffle may protrude axially from the inner wall of the fixation base 310, while the anti-drop pin may radially penetrate the fitting holes of the locking member 330 and the fixation base 310. These components are used to prevent relative separation between the fixation base 310 and the locking member 330 under extreme loads or misoperation, ensuring the structural integrity of the fixator 300.

Figure 9:
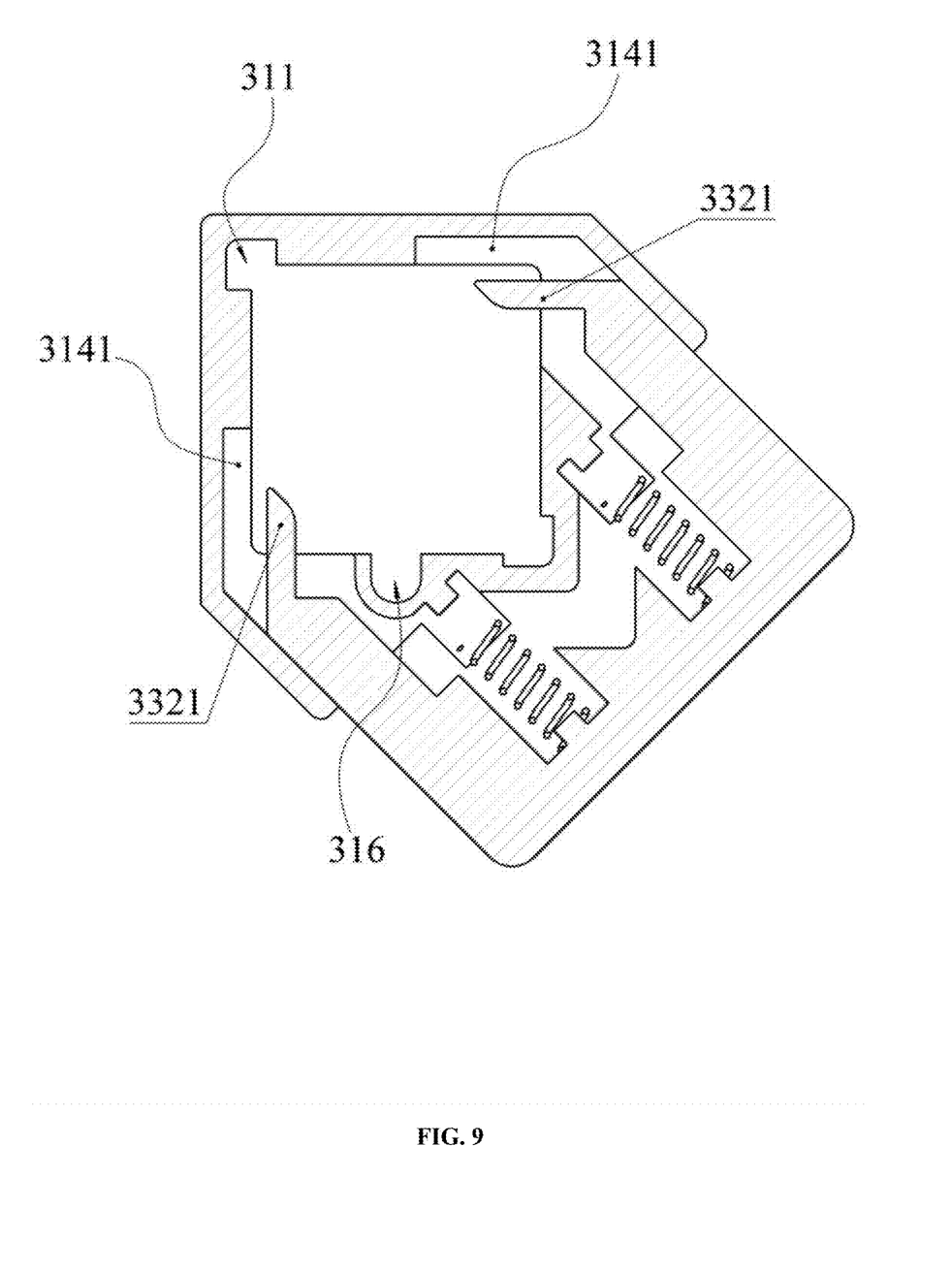
FIG. 9 is a cross-sectional view of the fixator for a telescopic rod in the embodiment shown in FIG. 5.
Figure 10:
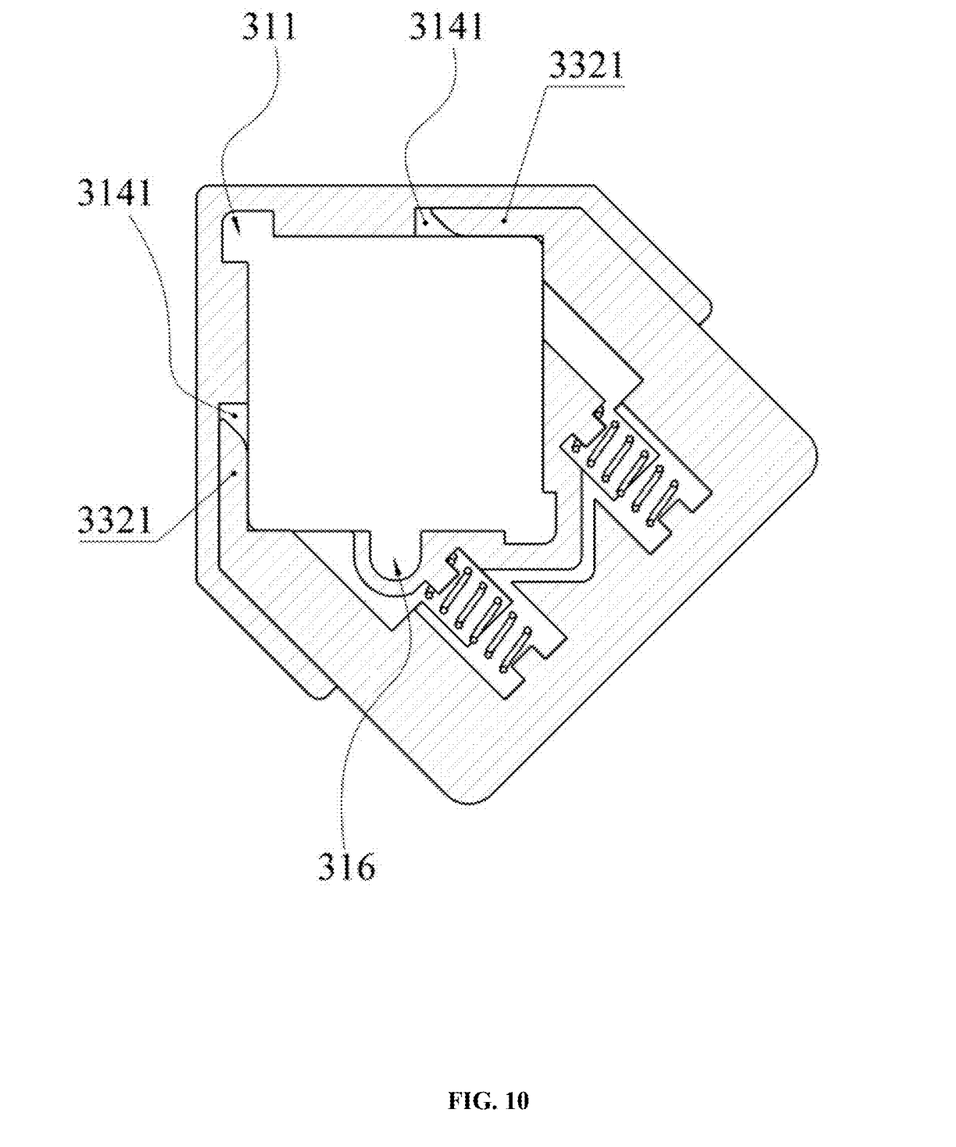
FIG. 10 is another cross-sectional view of the fixator for a telescopic rod in the embodiment shown in FIG. 9.

As shown in FIGS. 5, 9, and 10, the lock hole 314 has an unlocking hole position 3141, and the locking leg 332 forms a limiting end 3321 at its tip. Specifically, when the fixator 300 is in the locked position, the limiting end 3321 and the unlocking hole position 3141 are circumferentially offset. The limiting end 3321 of the locking leg 332 protrudes beyond the inner profile of the installation channel of the fixation base 310, sequentially passes through the locking notch 112, and is embedded into the locking hole 230 of the inner tube (see FIG. 3), forming an axial limiting fit with the locking hole 230. The locking surface of the limiting end 3321 restricts the movement of the inner tube 200 along the axial direction of the outer tube 100. When the fixator 300 is in the unlocked position, the limiting end 3321 slides toward the inner wall of the lock hole 314 and is embedded into the unlocking hole position 3141. At this point, the limiting end 3321 is disengaged from the locking hole 230, granting the inner tube 200 axial telescopic freedom and achieving unlocking.

In other embodiments (not shown in the drawings), the outer surface of the limiting end 3321 may be adaptively coated with an elastic buffer layer. The thickness of this buffer layer does not affect the fitting precision between the limiting end 3321 and the unlocking hole position 3141 or the locking hole 230. It serves to reduce relative friction and wear between the limiting end 3321 and the inner wall of the lock hole 314 or the edge of the locking hole 230 during the locking/unlocking process, while also dampening impact noise generated upon contact, thereby enhancing the durability of the structure.

The preferred embodiment provided by the present disclosure can be operated as follows:

When the user needs to adjust the extension length of the inner tube 200 relative to the outer tube 100, the user first presses the grip part 331 radially toward the outer tube 100 to disengage the locking leg 332 from its locked relationship with the inner tube 200. Then, the users firmly hold the outer tube 100 and move it upward or downward to adjust the extension length of the inner tube 200 relative to the outer tube 100. When the extension length of the inner tube 200 approaches the desired position, the user releases the grip part 331 and performs fine adjustment by moving the outer tube 100 up or down until the locking leg 332 is re-engaged with the inner tube 200 to complete the adjustment process.

In summary, the present disclosure achieves the following technical effects:

The clip 312 of the fixation base 310 forms a snap-fit with the groove 111 of the outer tube 100, achieving axial limitation of the fixation base 310 relative to the outer tube 100 and ensuring the stability of the assembly connection. The locking leg 332 of the locking member 330 is engaged with the locking hole 230 of the inner tube 200 to form an axial limiting fit, restricting axial movement of the inner tube 200 along the outer tube 100 and enhancing the stability of the telescopic locking structure. The second elastic member 320, through its abutment with the first stopper post 315 of the fixation base 310 and the second stopper post 333 of the locking member 330, provides elastic restoring force after the locking member 330 is unlocked by external force, driving the locking member 330 to automatically return to the locked position and realizing the locking reset function. Multiple sets of locking holes 230 (configurable as two, three, or more pairs) spaced axially along the inner tube 200 expand the axial telescopic adjustment range, meeting length adjustment needs in various usage scenarios. The unlocking hole position 3141 of the lock hole 314 in the fixation base 310 and the limiting end 3321 of the locking leg 332 of the locking member 330 achieve precise switching between locked and unlocked positions through circumferential embedding or misalignment distribution, reducing wear between components and extending the service life of the fixator 300.

The technical solution described in the present disclosure is not limited to specific fields. Its core fixator principles and structural design are equally applicable to telescopic rod assemblies in products requiring telescopic adjustment and locking functions, such as tents, outdoor sunshades, and portable clothes racks.

In tent application scenarios, the telescopic rod of its support structure can achieve stable locking through the fixator 300 of the present disclosure: the mating structure of the fixation base 310 and the locking member 330 is adapted to the telescopic support rod of the tent, the telescopic length of the tent support rod can be reliably fixed by utilizing the telescopic relationship between the outer tube 100 and the inner tube 200 and relying on the axial limitation between the locking leg 332 of the fixator 300 and the locking hole 230, ensuring the structural stability of the tent in various environments.

In outdoor awning application scenarios, by adapting the mating structure of the fixation base 310 and the locking member 330 to the telescopic bracket of the awning, rapid locking and unlocking of the bracket length can be achieved. Specifically, by applying the telescopic relationship between the outer tube 100 and the inner tube 200 with the main support rod of the awning, and utilizing the axial limitation between the locking leg 332 of the fixator 300 and the locking hole 230, the deployment range of the awning can be stably fixed to meet shading needs under different sunlight angles, enhancing the convenience of adjustment operations.

For portable clothes racks, considering their lightweight and foldable characteristics, the state-switching mechanism between the locking leg 332 and the unlocking hole position 3141 is integrated into the support leg structure of the rack. Through the engagement/disengagement of the limiting end 3321 with the corresponding hole positions, multi-level height adjustment of the clothes rack can be achieved. Moreover, the automatic reset function of the second elastic member 320 ensures structural stability after adjustment, preventing accidental collapse under load, thereby expanding the adaptability of the clothes rack in household and outdoor scenarios.

In the description of the present disclosure, it should be appreciated that directional terms such as "front, rear, up, down, left, right", "horizontal, vertical, perpendicular, horizontal" and "top, bottom" etc. indicate the orientation or positional relationship based on the orientation or positional relationship shown in the drawings, and are only for the convenience of describing the present disclosure and simplifying the description. In the absence of a contrary explanation, these directional terms do not indicate or imply that the device or element referred to must have a specific orientation or be constructed and operated in a specific orientation, and therefore should not be understood as limiting the scope of protection of the present disclosure; the directional terms "inside, outside" refer to the inside and outside relative to the contour of each component itself.

For the convenience of description, spatial relative terms such as "on . . . ", "above . . . ", "on the upper surface of . . . ", "upper" etc. may be used here to describe the spatial positional relationship of a device or feature with other devices or features as shown in the drawings. It should be appreciated that spatial relative terms are intended to encompass different orientations of the device in use or operation other than the orientation described in the drawings. For example, if the device in the drawing is inverted, the device described as "above other devices or structures" or "on other devices or structures" will subsequently be positioned as "below other devices or structures" or "under other devices or structures". Thus, the exemplary term "above" can include both "above" and "below" orientations. The device can also be positioned in other different ways (rotated 90 degrees or in other orientations), and the spatial relative descriptions used here should be interpreted accordingly.

In addition, it should be noted that the use of terms such as "first", "second" etc. to define components is for the convenience of distinguishing the corresponding components. Unless otherwise stated, the above terms have no special meaning, and therefore should not be understood as limiting the scope of protection of the present disclosure.

The above description is only a preferred embodiment of the present disclosure and is not intended to limit the present disclosure. For those skilled in the art, the present disclosure can have various modifications and changes. Any modifications, equivalent replacements, improvements etc. made within the spirit and principles of the present disclosure should be included within the scope of protection of the present disclosure.

What is claimed is:

1. A fixator for a telescopic rod, comprising:
   a fixation base provided with an installation channel for nesting the telescopic rod, an inner wall of the installation channel defining an inner profile; and
   a locking member comprising a grip part and a pair of locking legs integrally extending from both sides of the grip part, tail ends of the locking legs forming limiting ends, and the locking member being movably connected to the fixation base; and
   an elastic member disposed between the fixation base and the locking member and configured for providing an elastic restoring force to bias the locking member toward a locked position, wherein:
   the fixation base is provided with a lock hole corresponding to each locking leg, and the lock hole comprises an unlocking hole position;
   wherein in the locked position, the limiting ends protrude beyond the inner profile of the installation channel; and
   in an unlocked position, by applying an external force to press the grip part against an elastic force of the elastic member, the locking legs are driven to move, allowing the limiting ends to be accommodated within corresponding unlocking hole positions.

2. The fixator for a telescopic rod according to claim 1, wherein the locking member has a U-shaped frame structure, and the locking legs symmetrically extend radially outward from an open side of the locking member.

3. The fixator for a telescopic rod according to claim 1, wherein the fixation base is a square frame structure that is integrally formed.

4. The fixator for a telescopic rod according to claim 3, wherein the fixation base is provided with a pair of locking bosses symmetrically extending radially outward as a whole from two adjacent side walls in a circumferential direction of the fixation base.

5. The fixator for a telescopic rod according to claim 4, wherein the lock holes are provided on inner walls of the locking bosses, and the locking member is fixedly connected to the fixation base by inserting the locking legs into the lock holes.

6. The fixator for a telescopic rod according to claim 4, wherein reinforcing ribs are provided at a joint between the locking bosses and the fixation base.

7. The fixator for a telescopic rod according to claim 1, wherein each of the lock holes is provided with a first stopper post, and the locking member is provided with a second stopper post; and
the elastic member is a helical spring having a first end and a second end; and
the first stopper post abuts against the first end of the elastic member, and the second stopper post abuts against the second end of the elastic member.

8. The fixator for a telescopic rod according to claim 1, wherein an outer surface of the grip part is provided with anti-slip patterns.

9. A telescopic rod, comprising:
   an outer tube, an inner tube, and a fixator, wherein:
   a pair of locking notches are arranged on a side wall of the outer tube; and
   the inner tube is slidably sleeved within the outer tube, with at least one set of locking holes distributed axially along a side wall thereof at intervals; and
   the fixator comprises:
   a fixation base provided with an installation channel for sleeving the telescopic rod;
   a locking member comprising a grip part and a pair of locking legs integrally extending from both sides of the grip part, tail ends of the locking legs forming limiting ends, and the locking member being movably connected to the fixation base relative to the fixation base; and
   an elastic member disposed between the fixation base and the locking member and configured for providing an elastic restoring force to bias the locking member toward a locked position, wherein:
   the fixation base is provided with a lock hole corresponding to a position of each locking leg, and the lock hole comprises an unlocking hole position; and
   the outer tube is disposed within the installation channel;
   wherein in the locked position, each of the limiting ends sequentially passes through a respective locking notch of the pair of locking notches and is embedded into a respective locking hole of the at least one set of locking holes to restrict an axial displacement of the inner tube relative to the outer tube;
   and in an unlocked position, each of the limiting ends is disengaged from the respective locking hole of the at least one set of locking holes and retracts into the unlocking hole position into the unlocking hole position.

10. The telescopic rod according to claim 9, wherein both the outer tube and the inner tube are configured as tubular support rods extending longitudinally in a vertical direction.

11. The telescopic rod according to claim 10, wherein the outer tube is hollow inside to form a first accommodating cavity, and the inner tube is slidably installed within the first accommodating cavity.

12. The telescopic rod according to claim 11, wherein the inner tube is hollow inside to form a second accommodating cavity; and
the inner tube is provided with a V-shaped elastic piece arranged within the second accommodating cavity.

13. The telescopic rod according to claim 12, wherein the side wall of the inner tube is provided with a first through hole, a first end of the V-shaped elastic piece abuts against an inner wall of the inner tube, and a second end of the V-shaped elastic piece extends outside the first through hole.

14. The telescopic rod according to claim 13, wherein the fixation base is a square frame structure that is integrally formed.

15. The telescopic rod according to claim 14, wherein the fixation base is provided with a pair of locking bosses symmetrically extending radially outward as a whole from two adjacent side walls in a circumferential direction of the fixation base.

16. The telescopic rod according to claim 15, wherein an inner wall of each of the locking bosses is provided with a positioning groove; and
   in an unlocked position, the positioning groove forms a clearance space for the movement of the V-shaped elastic piece.

17. The telescopic rod according to claim 10, wherein the inner tube is provided with three sets of locking holes along an axial direction thereof, enabling multi-position adjustment of the inner tube relative to the outer tube.

18. The telescopic rod according to claim 9, wherein the fixation base is provided with a clip, the outer tube is provided with a groove, and the fixation base is fixedly connected to the groove on the outer tube through the clip.

19. The telescopic rod according to claim 9, wherein the locking member is a U-shaped frame structure, and the locking legs extend symmetrically and radially outward from an open side of the locking member.

20. The telescopic rod according to claim 9, wherein an outer surface of the grip part is sleeved with a silicone anti-slip sleeve.

* * * * *